Patented Dec. 20, 1949

2,492,128

UNITED STATES PATENT OFFICE 2,492,128

METHOD OF ACCELERATING THE GROWTH OF MICROORGANISMS

Ralph F. Shropshire, Cambridge, Mass., assignor to Raytheon Manufacturing Company, a corporation of Delaware No Drawing. Application October 26, 1946, Serial No. 706,061

5 Claims. (Cl. 195—82).

The present invention relates to a process of accelerating the growth of micro-organisms, especially vegetable micro-organism such as yeast, molds and bacteria.

There are many industrial processes requiring the culture of relatively large quantities of micro-organisms; for example, yeast for baking and fermentation; yeasts, molds and bacteria for pharmaceutical products; and bacteria for use in warfare.

It is the object of the present invention to provide a method for growing micro-organisms at a rate greatly accelerated over the normal growth rate.

According to the present invention a culture of the organisms in a nutrient medium is treated with compressional wave vibrations at a power level below cavitation so as to avoid destruction of the cell structure of the organisms for a period of approximately one minute to one hour followed by a non-vibratory growing period. If desired, and this is advantageous in some cases, periods of vibration may be alternated with periods of quiet. By this treatment a very great acceleration in the rate of growth of the organisms is obtained.

The mechanism whereby the accelerated growth of micro-organisms results from the use of compressional wave vibrations as above described is not fully understood but the following hypotheses are submitted as possible explanations, it being understood that my invention is not in any way to be limited thereby.

One of the effects of compressional wave vibration at a moderate power level may be to provide agitation which continually supplies to each cell a new nutritional environment. However, there are evidently also other effects. It may be that the metabolism of the cells is so stimulated by the vibration that the reproductive rate and/or the life processes are accelerated. It is also possible that the vibration changes the permeability of the cell wall so that the ingress of nutrient material is facilitated as is also the egress of metabolism products, some of which are known to be growth stimulating. It is quite likely that a combination of all of the above effects is produced.

In accelerating the growth of organisms by low power vibration, it appears that at a given power level the rate of growth increases to a certain extent with an increase in the length of time of vibration. However, a limit is here soon reached. I have found however that in many cases a further increase in the ultimate yield of organisms can be obtained by alternating periods of vibration with periods of quiet. The time lengths of these periods are different for different organisms and they must therefore be adjusted to suit the particular organisms in each case in order to obtain maximum yield in a given total time. I have found it to be beneficial so to adjust the time length of the period of vibration treatment to coincide approximately with the time length of the life cycle of the organisms; that is, statistically speaking, only the first generation of the organisms is vibrated. A period of rest then follows, during which the second generation of the organisms is produced. Vibration may again be commenced with the appearance of the third generation of the organisms, and so on.

As an example of the procedure according to the present invention, a culture of ordinary household yeast of the genus Saccharomyces was prepared by permitting growth at room temperature in cane sugar medium for approximately 24 hours. This culture was vibrated in a 360 cycle vibrator of the general type described in U. S. Patent No. 2,138,051 issued November 29, 1938 to R. L. Williams. In the apparatus used, the vibration chamber diaphragm had a diameter of approximately 24 inches and the input power was approximately ⅓ kw., or greater up to an amplitude of vibration of the diaphragm somewhat below cavitational amplitude. A sufficient quantity of the yeast culture was available to permit continuous recirculation of the material from a container through the vibrator and back to the container. Vibration was continued for a period of approximately ten minutes. After treatment, additional cane sugar medium was supplied to the treated cells which were allowed to grow for somewhat less than twenty-four hours. Comparative tests of the rate of growth of non-vibrated yeast cells and the vibrated cells showed an increased activity on the part of the treated cells some fifty times greater than that of the untreated cells.

Having now described my invention, I claim:

1. A method of accelerating the growth of vegetable micro-organisms which comprises treating a culture of the organisms intermittently with compressional wave vibrations at a power level insufficient to disrupt the cell structure of the organisms.

2. A method of accelerating the growth of the vegetable micro-organisms which comprises treating a culture of the organisms with compressional wave vibrations at a power level insufficient to disrupt the cell structure of the organisms and approximately for a period of time corresponding to the life cycle of one generation of the organisms.

3. A method of accelerating the growth of the vegetable micro-organisms which comprises treating a culture of the organisms with compressional wave vibrations at a power level insufficient to disrupt the cell structure of the organisms and approximately for a period of time corresponding to the life cycle of one generation of the organisms, permitting the treated culture of the organisms to grow without vibration for a period of time sufficient to produce a second and third generation of the organisms and again vibrating the culture commencing with the appearance of the third generation of the organisms for a period of time approximately equal to the duration of the life cycle of said third generation.

4. A method of accelerating the growth of the vegetable micro-organisms which comprises treating a culture of the organisms with compression wave vibrations at a power level insufficient to disrupt the cell structure of the organisms and approximately for a period of time corresponding to the life cycle of one generation of the organisms, allowing the treated culture to grow and thereafter similarly vibrating successive alternating generations of the organisms.

5. A method of accelerating the growth of yeast which comprises preparing a culture of yeast in a cane sugar medium permitting growth at room temperature for approximately 24 hours thereafter vibrating the culture at a power input insufficient to disrupt the cell structure of the yeast organisms for a period of approximately 10 minutes supplying additional cane sugar medium and allowing the culture to grow aproximately an additional 24 hours.

RALPH F. SHROPSHIRE.

REFERENCES CITED

The following references are of record in the file of this patent:

UNITED STATES PATENTS

| Number | Name | Date |
|---|---|---|
| 2,138,839 | Chambers | Dec. 6, 1938 |
| 2,196,361 | Liebesny et al. | Apr. 9, 1940 |

FOREIGN PATENTS

| Number | Country | Date |
|---|---|---|
| 550,317 | Great Britain | Jan. 4, 1943 |